United States Patent [19]

Jones, Jr.

[11] 4,209,540
[45] Jun. 24, 1980

[54] METHOD FOR STRAIGHTENING SAUSAGE LINKS

[75] Inventor: Edward C. Jones, Jr., Fort Atkinson, Wis.

[73] Assignee: Jones Dairy Farm, Fort Atkinson, Wis.

[21] Appl. No.: 4,000

[22] Filed: Jan. 17, 1979

Related U.S. Application Data

[62] Division of Ser. No. 756,483, Jan. 3, 1977.

[51] Int. Cl.² ................ B65B 55/00; A23P 1/00
[52] U.S. Cl. .................................. 426/414; 17/1 F; 100/152; 264/310; 264/320; 425/372; 426/284; 426/410; 426/513
[58] Field of Search ............... 426/646, 524, 512, 513, 426/410, 517, 105, 129, 414, 284; 264/320, 323, 310; 425/335, 363, 371, 372; 198/415, 607, 626; 100/153, 152, DIG. 10; 17/1 F, 49

[56] References Cited

U.S. PATENT DOCUMENTS

| | | | |
|---|---|---|---|
| 1,983,681 | 12/1934 | Seaver | 426/105 |
| 3,589,915 | 6/1971 | Lustig | 426/105 |
| 3,672,913 | 6/1972 | Podebradsky | 426/646 |

*Primary Examiner*—S. Leon Bashore
*Assistant Examiner*—George C. Yeung
*Attorney, Agent, or Firm*—Andrus, Sceales, Starke & Sawall

[57] ABSTRACT

A method for straightening elongated articles such as sausage links. A pair of horizontal endless belt conveyors operate at slightly different speeds. The lower belt conveyor has a greater length than the upper belt conveyor so that the end of the lower conveyor projects beyond the corresponding end of the upper conveyor. Chilled sausage links are conveyed upwardly by an elevator and deposited on the projecting end of the lower conveyor and passed between the belts. As the sausage links pass between the belts, they are rotated to thereby straighten the links.

6 Claims, 7 Drawing Figures

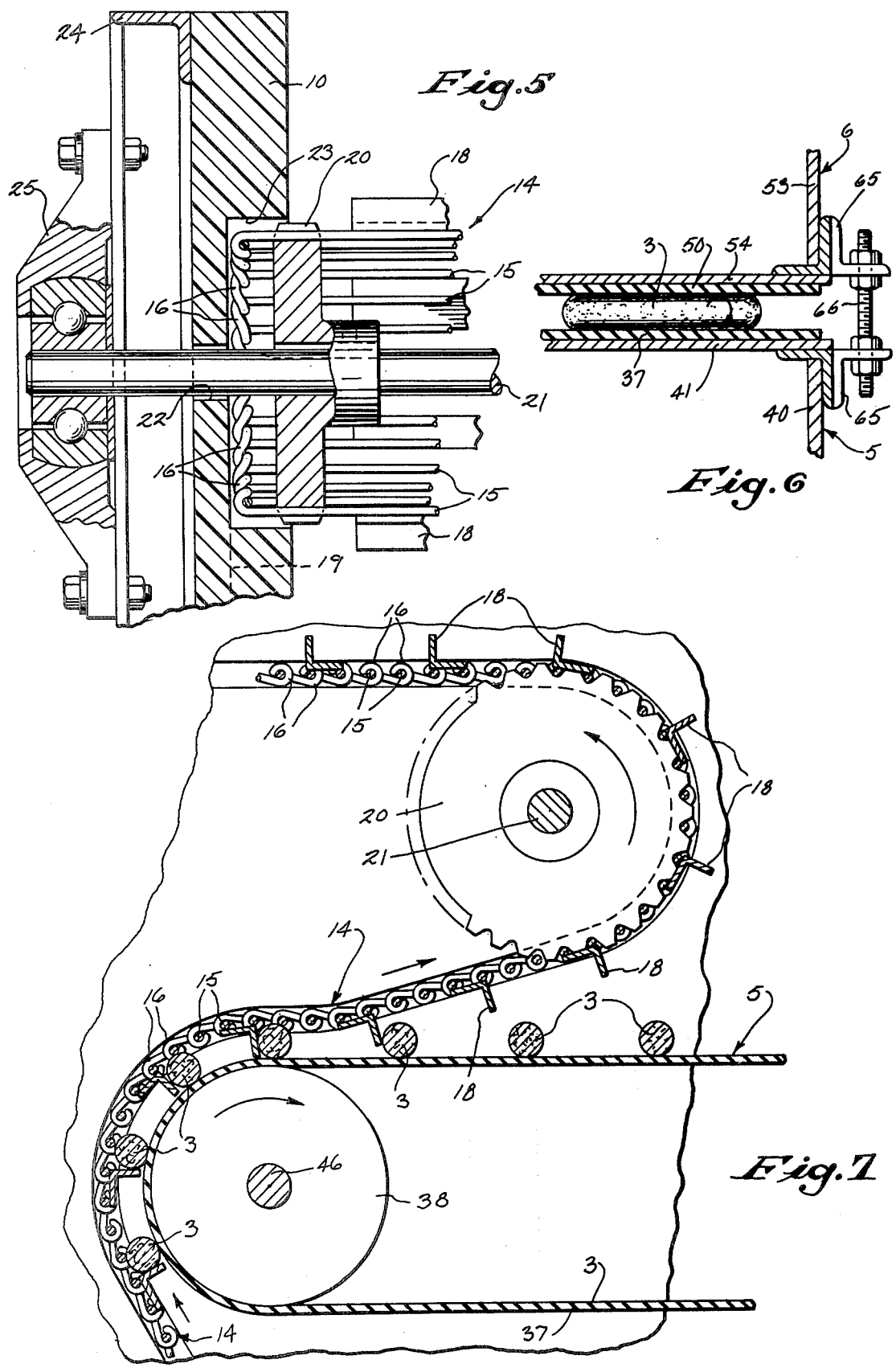

METHOD FOR STRAIGHTENING SAUSAGE LINKS

This is a division of application Ser. No. 756,483, filed Jan. 3, 1977.

BACKGROUND OF THE INVENTION

Sausage, such as pork sausage, is frequently stuffed in natural casing. Because natural casing has a generally spiral configuration, after stuffing and linking, the links have a generally curved or bowed shape. The sausage links are normally packed in boxes, and due to the bowed configuration, automatic packaging equipment cannot be used to package the sausage links, but instead the sausage links must be manually packaged. Manual packing results in substantially increased labor costs as compared to situations where automatic packaging equipment can be utilized.

SUMMARY OF THE INVENTION

The invention relates to a method for straightening elongated cylindrical articles, such as sausage links stuffed in natural casings. In the method a pair of generally horizontal, endless belt conveyors operate in the same direction and at slightly different speeds. The lower belt conveyor has a greater length than the upper conveyor so that the inlet end of the lower conveyor projects beyond the corresponding end of the upper conveyor. The sausage links are initially chilled, and the chilled links are conveyed upwardly by a cleat-type elevator and deposited on the projecting end of the lower conveyor. The links then pass between the moving belt conveyors and are rotated about their axes to thereby straighten the chilled links. As the links are in a chilled condition, they will not substantially revert to their original bowed configuration, and thus can be handled and packaged in boxes by automatic packaging equipment.

As the straightened links are more uniform in shape, the packed appearance of the sausage links is more attractive to the consumer.

The upper end of the elevator is located adjacent the inlet end of the lower conveyor, and as the sausage links ride upwardly on the elevator, they are trapped between the elevator and the lower belt conveyor, both of which are operating at the same speed, thereby insuring that the links will be deposited in a transverse manner on the lower belt conveyor.

Other objects and advantages will appear in the course of the following description.

DESCRIPTION OF THE DRAWINGS

The drawings illustrate the best mode presently contemplated of carrying out the invention.

In the drawings:

FIG. 5 is a section showing the drive for the elevator conveyor;

FIG. 6 is a section taken along line 6—6 of FIG. 1 and showing the mounting of the horizontal belt conveyors; and FIG. 7 is an enlarged section of the belt conveyors showing the transfer of the sausage links from the elevator to the lower belt conveyor.

DESCRIPTION OF THE PREFERRED EMBODIMENT

Figure 1:
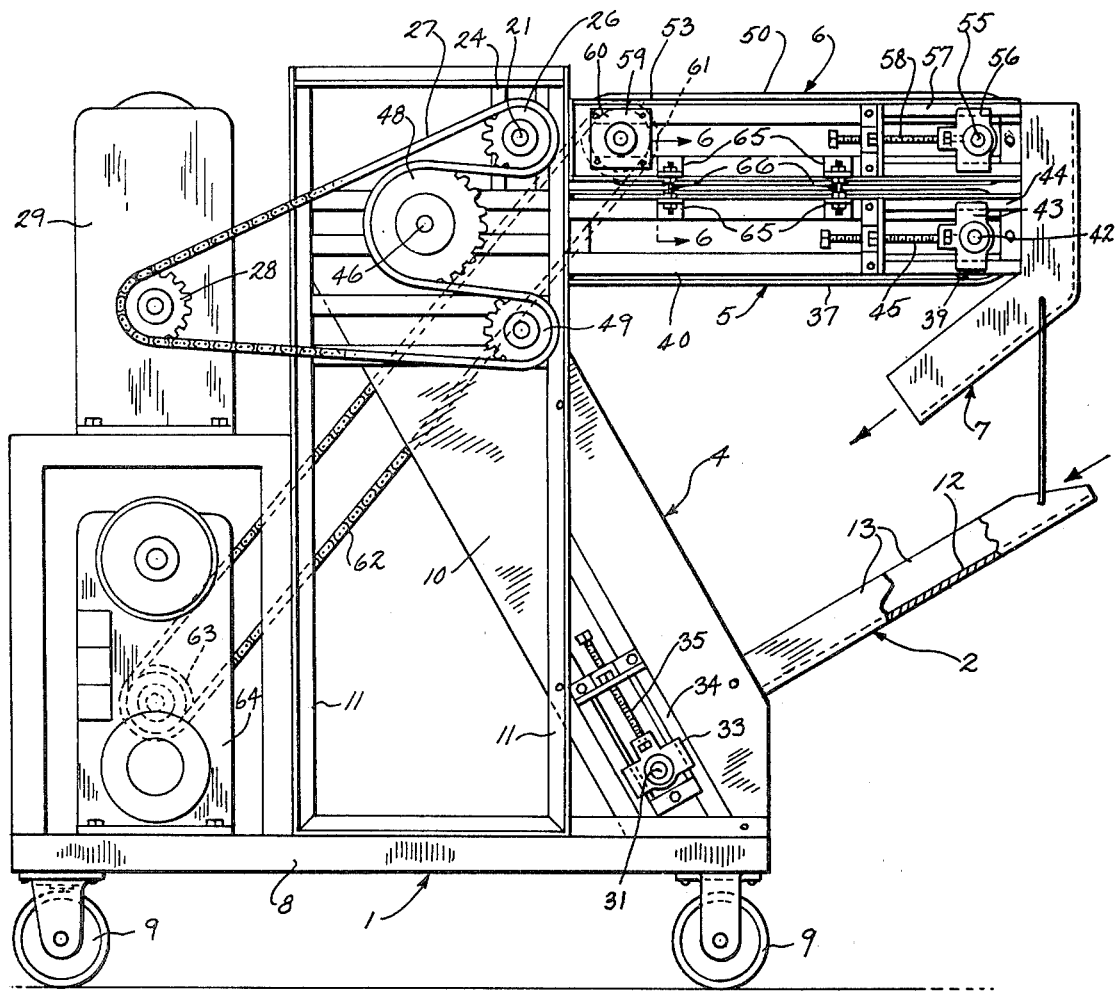
FIG. 1 is a side elevation of the apparatus of the invention.
Figure 2:
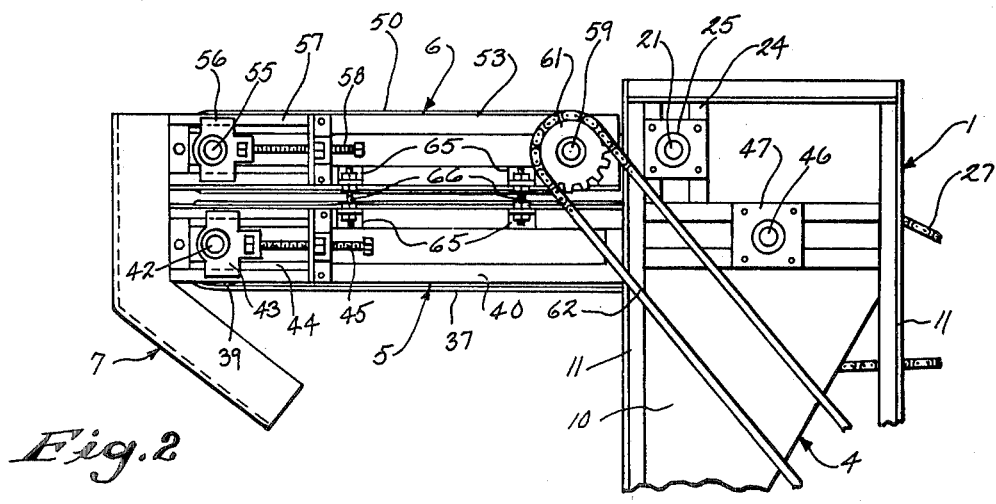
FIG. 2 is a fragmentary side elevation of the opposite side of the apparatus.

FIG. 1 illustrates an apparatus for straightening sausage links which comprises a frame 1 and hopper 2 is mounted on the frame. Chilled sausage links 3 are fed to the hopper 2 and are individually elevated by an elevator 4 and deposited on the inlet end of the lower of two cooperating belt conveyors 5 and 6. The links 3 passing between the belt conveyors 5 and 6 are rotated about their axes to straighten the links and the links are then discharged from the conveyors into a chute 7 where they can be fed to a transverse conveyor, not shown, leading to the automatic packaging equipment.

The frame 1 includes a base 8 which is supported on a series of wheels 9 enabling the unit to be moved throughout the plant. Extending upwardly from the forward end of the base are spaced, side plates 10, and the plates are supported by vertical supports 11 of frame 1 which extend upwardly from the base 8.

The hopper 2 is formed of an inclined bottom surface 12 and a pair of side flanges 13 which are connected to the side plates 10.

Figure 4:
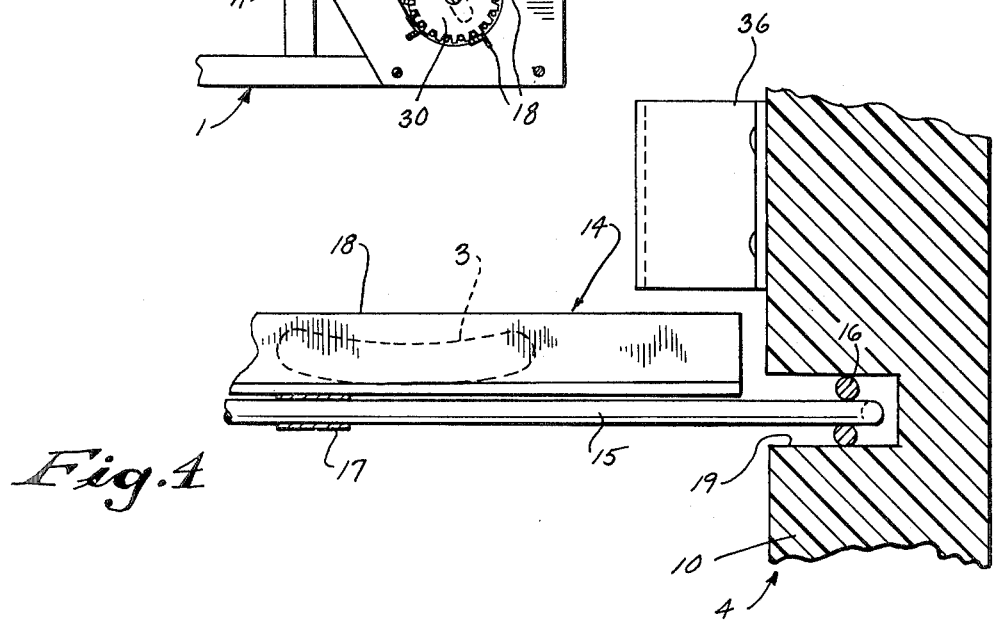
FIG. 4 is a fragmentary section showing the attachment of elevator conveyor links to the side plates.

The elevator 4 includes an endless, link-type conveyor 14 which travels in a conveying path that is at an angle of about 60° C. with respect to the horizontal. As best shown in FIGS. 4, 5 and 7, the conveyor 14 is composed of a plurality of generally parallel rods 15 which are located transverse to the direction of movement of the conveyor, and the rods 15 have bent ends 16 which are interlocked with the ends of adjacent rods. Flat links 17 serve to pivotally connect the rods together.

Extending outwardly from the links 17 are a series of generally parallel cleats or flights 18 which are spaced apart in the range of about ½ to 6 inches. The sausage links 3 will rest on the flights 18 and are conveyed upwardly from the hopper 2 through movement of the conveyor 14.

Figure 3:
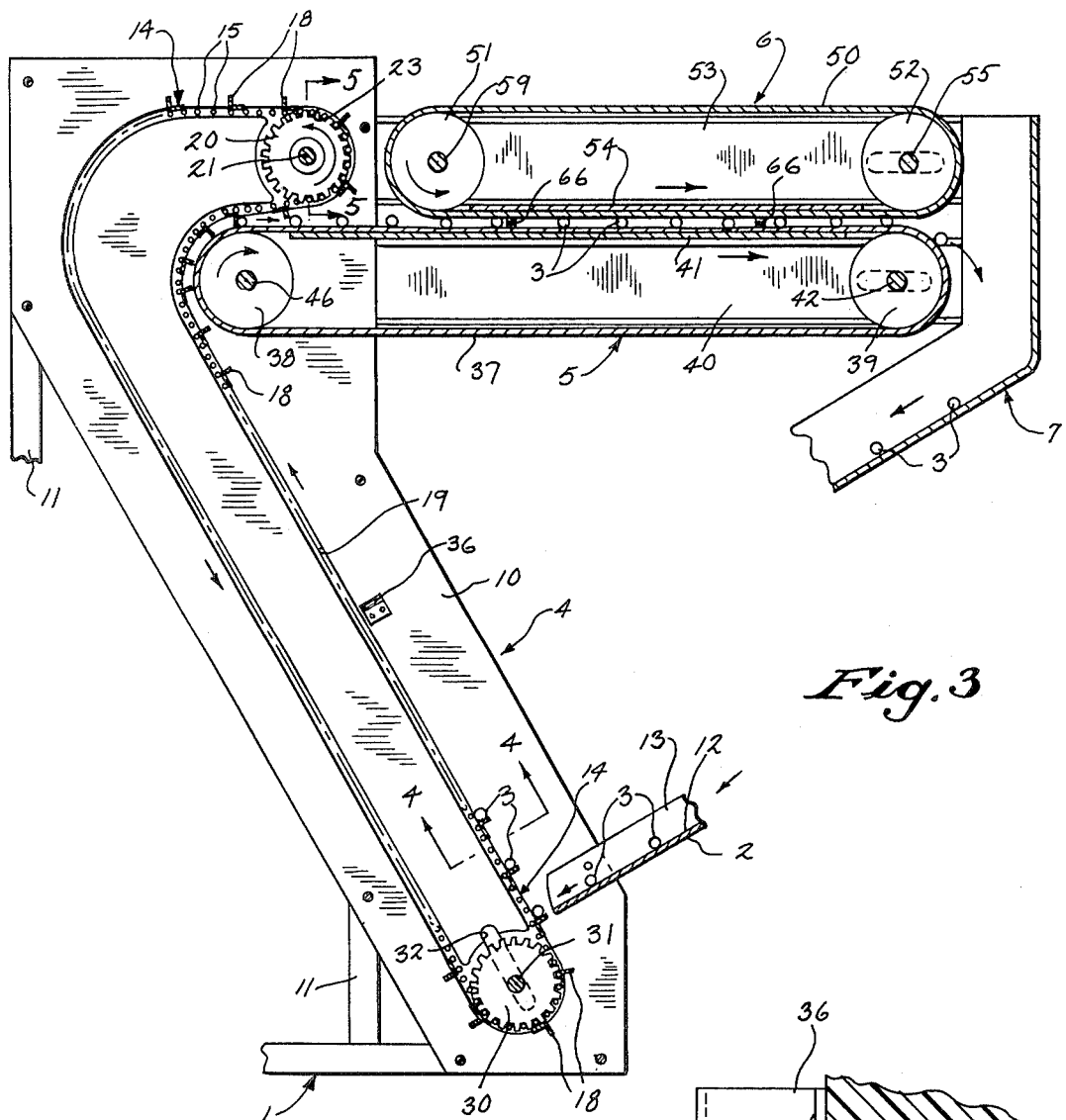
FIG. 3 is a vertical section showing the elevator conveyor and the horizontal belt conveyors.

To guide the conveyor 14 in its path of movement, the interconnected bent ends 16 of the rods are guided within grooves 19 milled in the inner surfaces of the side plates 10, and the configuration of the milled groove is best illustrated in FIG. 3.

The conveyor 14 is driven by a pair of drive sprockets 20, the teeth of which engage the rods 15, as shown in FIG. 5. The drive sprockets 20 are mounted on a shaft 21 which extends through openings 22 in the respective side plates. The inner surface of each side plate is provided with a recess 23 which communicates with groove 19 and receives the respective sprocket, as shown in FIG. 5.

To journal the shaft 21 for rotation, a cage 24 is mounted on the upper portion of frame 1 and each cage 24 carries a bearing assembly 25 which supports the shaft 21.

One end of the shaft carries a sprocket 26 that is connected by chain 27 to a sprocket 28 of a variable speed drive unit 29 that is mounted on the frame 1. With this connection, operation of the drive unit 29 will rotate the shaft 21 to drive the conveyor 14.

The lower end of the conveyor 14 is supported by a pair of idler sprockets 30, the teeth of which engage the rods 15 of the conveyor. Sprockets 30 are carried by shaft 31 which extends through slots 32 in the respective side plates 10 and the ends of the shaft 31 are journaled within bearing assemblies 33. To adjust the tension on the conveyor 14, the bearing assemblies are mounted for sliding movement in a guide structure 34 secured to the outer surface of each side plate 10. A rode 35 is threaded within an opening in the guide structure 34 and is connected to the respective bearing assembly 33, and through adjustment of the rods 35, the bearing assemblies 33 can be moved within the guide structures 34 to thereby adjust the tension on the conveyor 14.

Occasionally, one of the sausage links 3 may be conveyed upwardly on one of the elevator flights 18 in a generally vertical manner with the upper end of the link riding against the side plate 10. If the link is in the position it would not be properly deposited on the lower conveyors 5, and therefore the deflectors 36 are mounted on each side plate 10 and project inwardly over the conveyor. The deflectors 36 serve to engage and deflect any sausage link 3 which may be riding upwardly along the side plate 10 and the link will fall back into the hopper 2 to be reconveyed by the elevator 4.

The conveying path of the conveyor 14 is at a relatively steep angle, in the neighborhood of 60° to the horizontal, and thus if any sausage links 3 are not fully supported by the cleats or flights 18, the links will fall back to the hopper and will be reconveyed upwardly by the elevator.

As illustrated in FIG. 3, the conveyor 14 moves upwardly at an angle in its conveying path from idler sprockets 30, then travels generally horizontally over the end of the lower conveyor 5, then passes around the drive sprockets 20 in a reverse horizontal path and finally moves downwardly in a return path of travel to the idler sprocket 30.

The lower belt conveyor 5 includes an endless belt 37 having a roughened surface which is carried by a drive roll 38 and an idler roll 39, both of which are mounted on a framework 40 that is supported from frame 1. A flat support plate 41 is connected to the framework 40 and is located immediately beneath the upper path of travel of the belt 37 to support the belt in movement.

The idler roll 39 is mounted on shaft 42 which is journaled within bearing blocks 43 that are slidable within a guide structure 44 connected to the sides of framework 40. A rod 45 is threaded within the guide structure 44 and is connected to the bearing block. By adjustment of the rods 45, the bearing blocks 43 can be moved to adjust the position of the roll 39 and the tension of the belt 37.

The drive roll 38 is mounted on shaft 46 which is journaled within bearing assemblies 47 mounted on the upper portion of frame 1. One end of the shaft 46 carries a sprocket 48 which is driven by the chain 27. In addition, the chain 27 is trained over an idler sprocket 49 which is journaled on the frame 1. With this arrangement, the chain 27 will drive the elevator 4 and the lower belt conveyor 5 in synchronization.

As illustrated in FIG. 7, the path of travel of the conveyor 14 of elevator 4 is arranged so that it complements the path of travel of the belt 37 as it passes over the drive roll 38, with the spacing between the conveyor 14 and the belt 37 being slightly greater than the diameter of a sausage link 3. As the conveyor 14 and the belt 37 are travelling at the same speed, the sausage links will be trapped between the conveyor 14 and the belt 37 and as the conveyor 14 moves away from the horizontal path of the belt 37, the sausage links will be deposited on the belt with the axes of the links transverse to the direction of belt movement. This arrangement insures that the sausages will be properly oriented on the belt 37 and eliminates any possibility of the links bouncing or rolling on the belt which could cause misalignment of the sausages. The upper conveyor 6 is constructed in a manner similar to that of the lower conveyor and includes an endless belt 50 having a rough textured surface which is supported by a drive roll 51 and idler roll 52, both of which are mounted on the framework 53 of the upper conveyor. A flat support plate 54 is carried by the framework 53 and is located immediately above the lower path of travel of the belt 50 and serves to prevent upward deflection of the belt as the links 3 pass between the belts 37 and 50.

The idler roll 52 is mounted on a shaft 55 which is journaled within bearing blocks 56 and each bearing block 56 is mounted for sliding movement in a guide structure 57 mounted on the side of the framework 53. In the manner previously described, a rod 58 is threaded within the guide structure 57, and is connected to each bearing block 56, and by adjustment of the rod 58, the bearing block 58 can be moved with respect to the guide structure to vary the tension on the belt 50.

The drive roll 51 is carried by shaft 59 which is journaled within bearing blocks 60 mounted on the sides of the framework 53. One end of the shaft 59 carries a sprocket 61 which is connected by chain 62 to a sprocket 63 of a variable speed drive unit 64 that is mounted on the frame 1. Operation of the drive unit 64 will drive the roll 51 to thereby move the belt 50 in its path of travel.

As shown in FIG. 3, the belts 37 and 50 are moving in the same direction, that is, the lower path or run of the upper belt 50 and the upper path or run of the lower belt 37 are both moving in the same direction, and preferably at slightly different speeds so that the links 3 will be rotated about their axes as they pass between the cooperating belts 37 and 50. It is preferred to operate the upper belt 50 at a speed of about 5% to 100% faster than the speed of the lower belt 37, so that the links will be rotated one-half or more revolutions in passing between the conveyors. This rotating action serves to straighten the chilled links and due to the chilled condition the links will not substantially revert to the bowed or curved condition.

As shown in FIG. 6, the frame 53 of the upper conveyor is supported from the frame of the lower conveyor. A series of L-shaped brackets 65 extend outwardly from the respective conveyors and are connected by vertical studs 66. The studs 66 provide a means for adjusting the vertical spacing between the upper and lower conveyors.

In operation, the sausage links 3 are chilled in a conventional manner so that the average or mean temperature throughout the cross section of the link is in the range of about 10° F. to 40° F. In practice, the links will not have a uniform temperature throughout their cross section and in some cases the outer surface layer may be frozen, while the center of the link may be at a temperature in the range of 25° F. to 100° F. In any case, the links should be at a chilled temperature at which they can be straightened without fracturing, and will retain the straightened shape without substantially reverting to their natural bowed condition.

The chilled links 3 are deposited in the hopper 2 and are individually elevated by the elevator 4, best shown in FIG. 1. Any links which may be in a generally vertical orientation and ride against the side plates 10 will be deflected back to the hopper by the deflectors 36.

As the links approach the lower conveyor 5 they are trapped between the conveyor 14 and the belt 37, as illustrated in FIG. 7. As the conveyor 14 and belt 37 are operating at the same speed, the links will be smoothly transferred to the belt 37 and properly oriented, transverse to the direction of movement of the belt 37. As previously noted, this method of transfer prevents the links from bouncing or rolling across the belt 37 and thereby insures proper transverse alignment of the links on the belt 37.

The links 3 then pass between the belts 37 and 50 and will be rotated about their axes. The belt speeds can be adjusted so that the links will rotate one-half or more revolutions when passing between the belts.

The links are then discharged from the conveyors 5 and 6 into the chute 7 and a conveyor, not shown, can be located at the lower end of the chute to convey the straightened links to automatic packaging equipment.

The present invention provides a method for automatically straightening bowed or curved articles so that they can be more readily packaged by automatic packaging equipment. While the invention has particular application to sausage links stuffed in natural casings, it can also be employed to straighten other elongated articles and correct deformities or out-of-roundness in the article.

Various modes of carrying out the invention are contemplated as being within the scope of the following claims particularly pointing out and distinctly claiming the subject matter which is regarded as the invention.

I claim:

1. A method of straightening sausage links, comprising the steps of chilling naturally bowed sausage links to a temperature such that the links can be straightened and will substantially retain the straightened configuration, introducing the chilled sausage links between a pair of cooperating belts, and operating the belts in the same direction and at different speeds to thereby rotate the links about their axes and straighten the links.

2. The method of processing sausage links, comprising the steps of chilling bowed sausage links to a temperature sufficiently low to prevent the bowed links from substantially reverting to their original bowed configuration after straightening, depositing the chilled bowed links on a first moving belt with the axes of the links disposed generally transverse to the direction of movement of said first belt, engaging the upper surfaces of the links disposed on the first belt with a second belt moving in the same direction as said first belt, operating the second belt at a different speed than the first belt to thereby rotate the links about their axes and straighten the same, removing the straightened links from said first belt, and packaging the straightened links.

3. The method of claim 2, and including the step of elevating the chilled links on an upwardly inclined feed conveyor, and transferring the links from the feed conveyor to said first belt.

4. The method of claim 3, and including the step of positioning the links between mating paths of travel of said feed conveyor and said first belt prior to depositing said links on said first belt, and operating said feed conveyor and said first belt at the same speed.

5. The method of claim 3, wherein elevating the chilled links comprises the step of placing the individual links on spaced cleats on the upwardly inclined feed conveyor.

6. The method of claim 2, and including the step of operating the second belt at a faster speed than the first belt.

* * * * *

UNITED STATES PATENT AND TRADEMARK OFFICE
CERTIFICATE OF CORRECTION

PATENT NO. : 4,209,540

DATED : June 24, 1980

INVENTOR(S) : Edward C. Jones, Jr.

It is certified that error appears in the above-identified patent and that said Letters Patent are hereby corrected as shown below:

Column 2, line 33, Cancel "60°C" and substitute therefor ---60°---, Column 3, line 10, Cancel "rode" and substitute therefor ---rod---

Signed and Sealed this

Twenty-eighth Day of October 1980

[SEAL]

Attest:

Attesting Officer

SIDNEY A. DIAMOND

Commissioner of Patents and Trademarks